March 15, 1966  W. W. McMULLEN  3,240,008
CONTROL SYSTEM FOR A MATERIAL HANDLING VEHICLE
Filed April 8, 1963  4 Sheets-Sheet 2
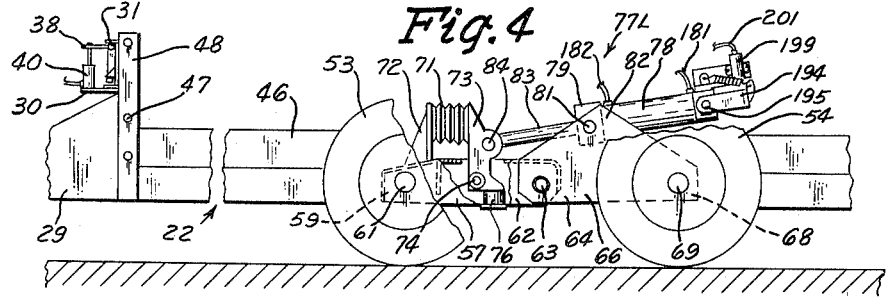
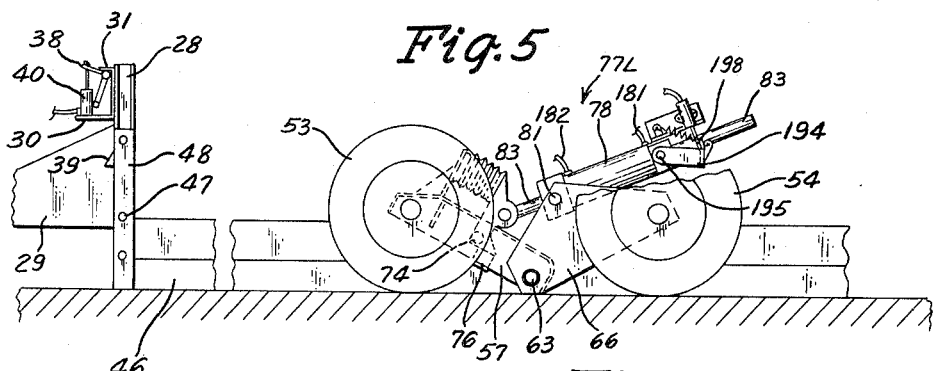
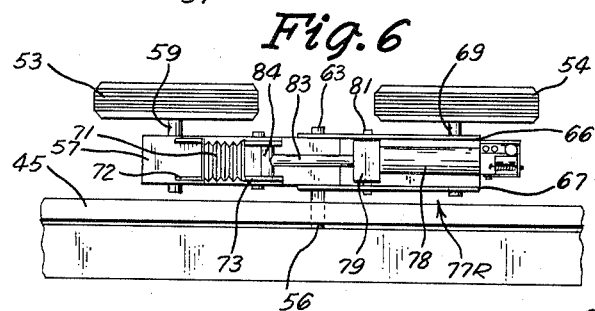
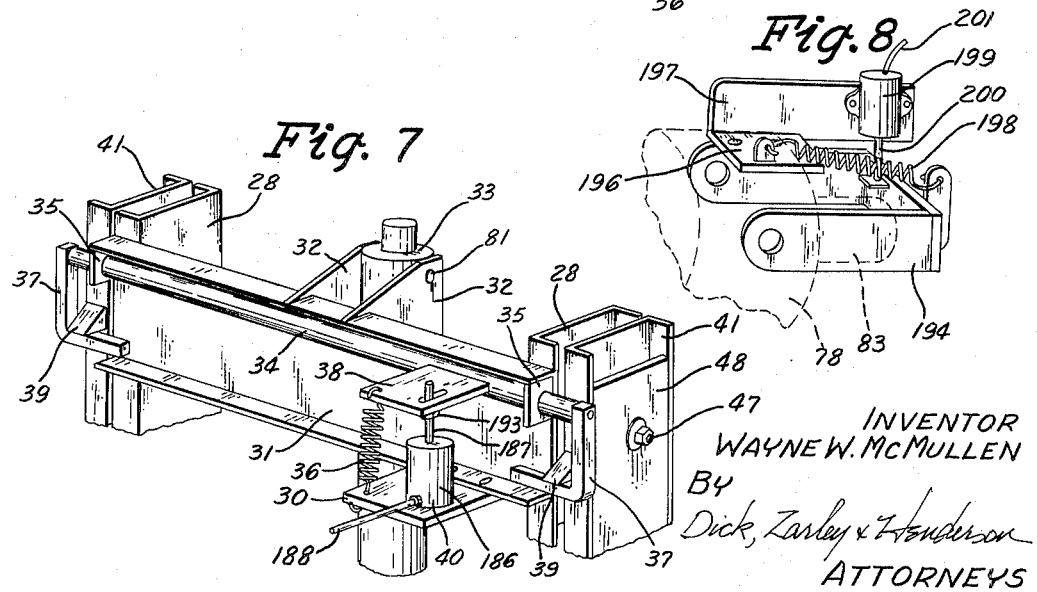
INVENTOR
WAYNE W. McMULLEN
BY
Dick, Zarley & Henderson
ATTORNEYS March 15, 1966  W. W. McMULLEN  3,240,008
CONTROL SYSTEM FOR A MATERIAL HANDLING VEHICLE
Filed April 8, 1963  4 Sheets-Sheet 3
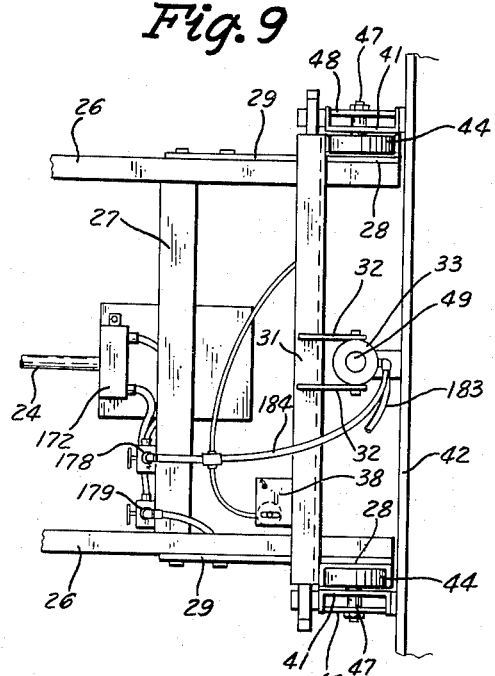
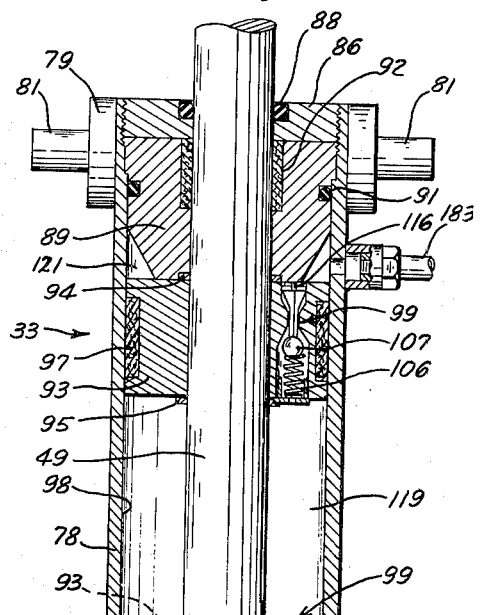
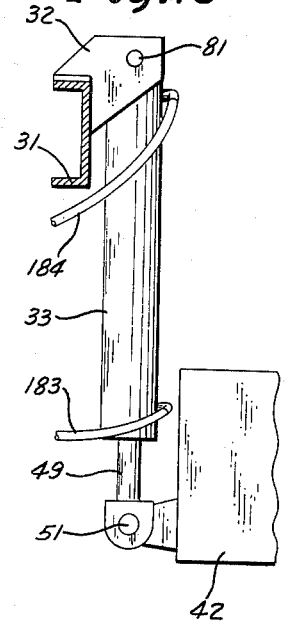
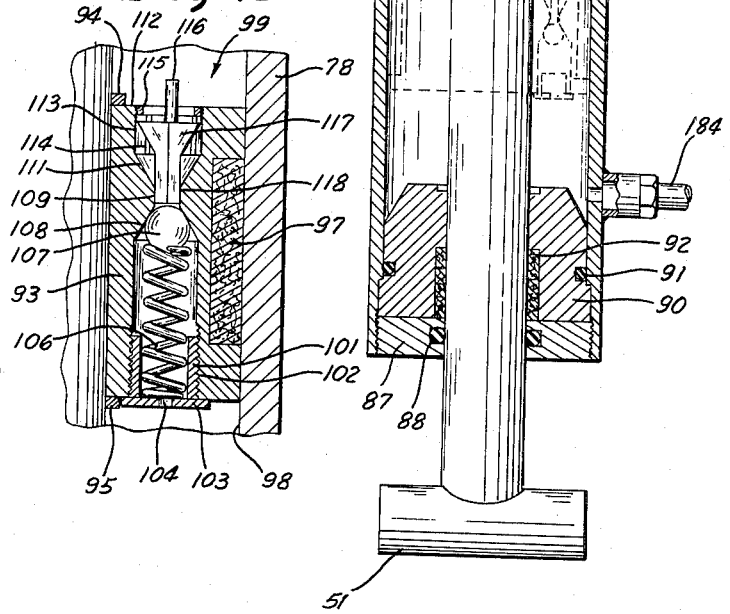
INVENTOR
WAYNE W. McMULLEN
BY
Dick, Zarley & Henderson
ATTORNEYS March 15, 1966
W. W. McMULLEN
3,240,008
CONTROL SYSTEM FOR A MATERIAL HANDLING VEHICLE
Filed April 8, 1963
4 Sheets-Sheet 4
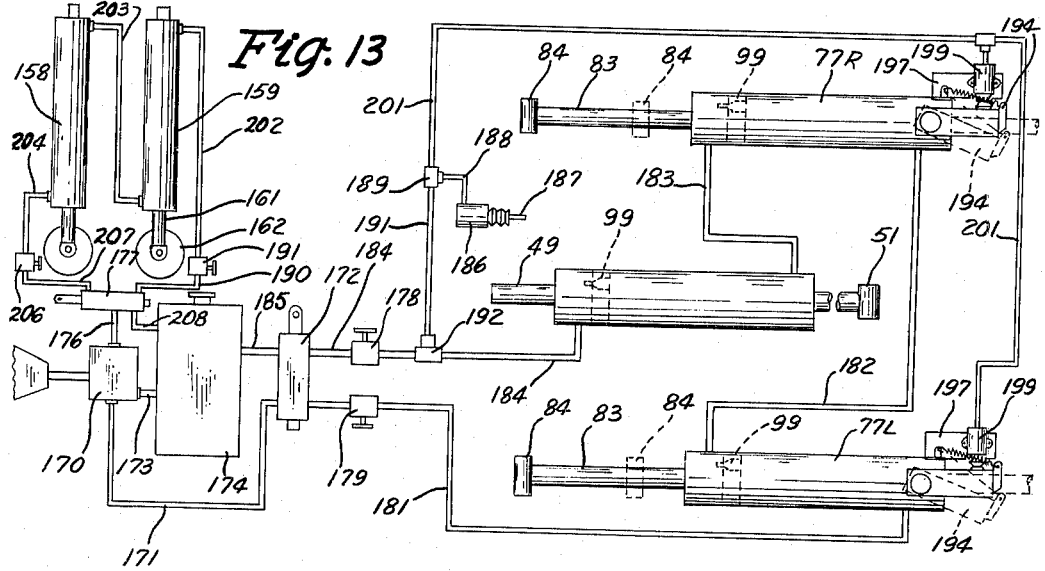
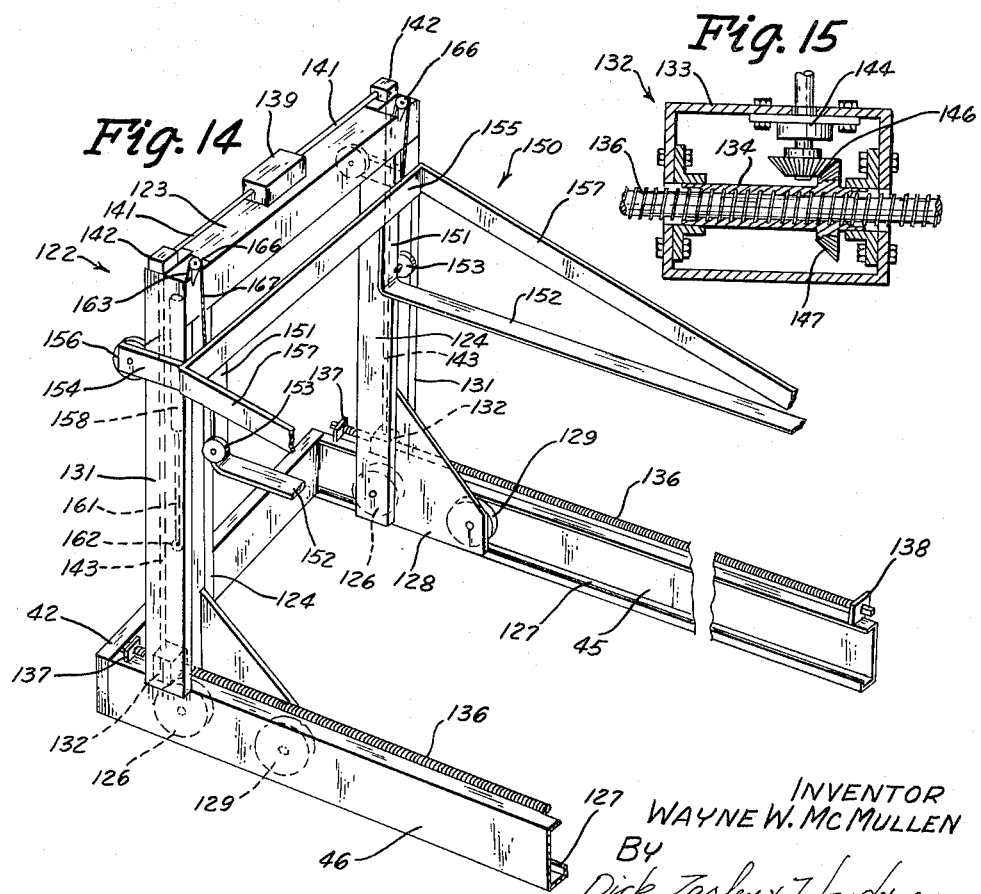
INVENTOR
WAYNE W. McMULLEN
BY
Dick, Zarley & Henderson
ATTORNEYS

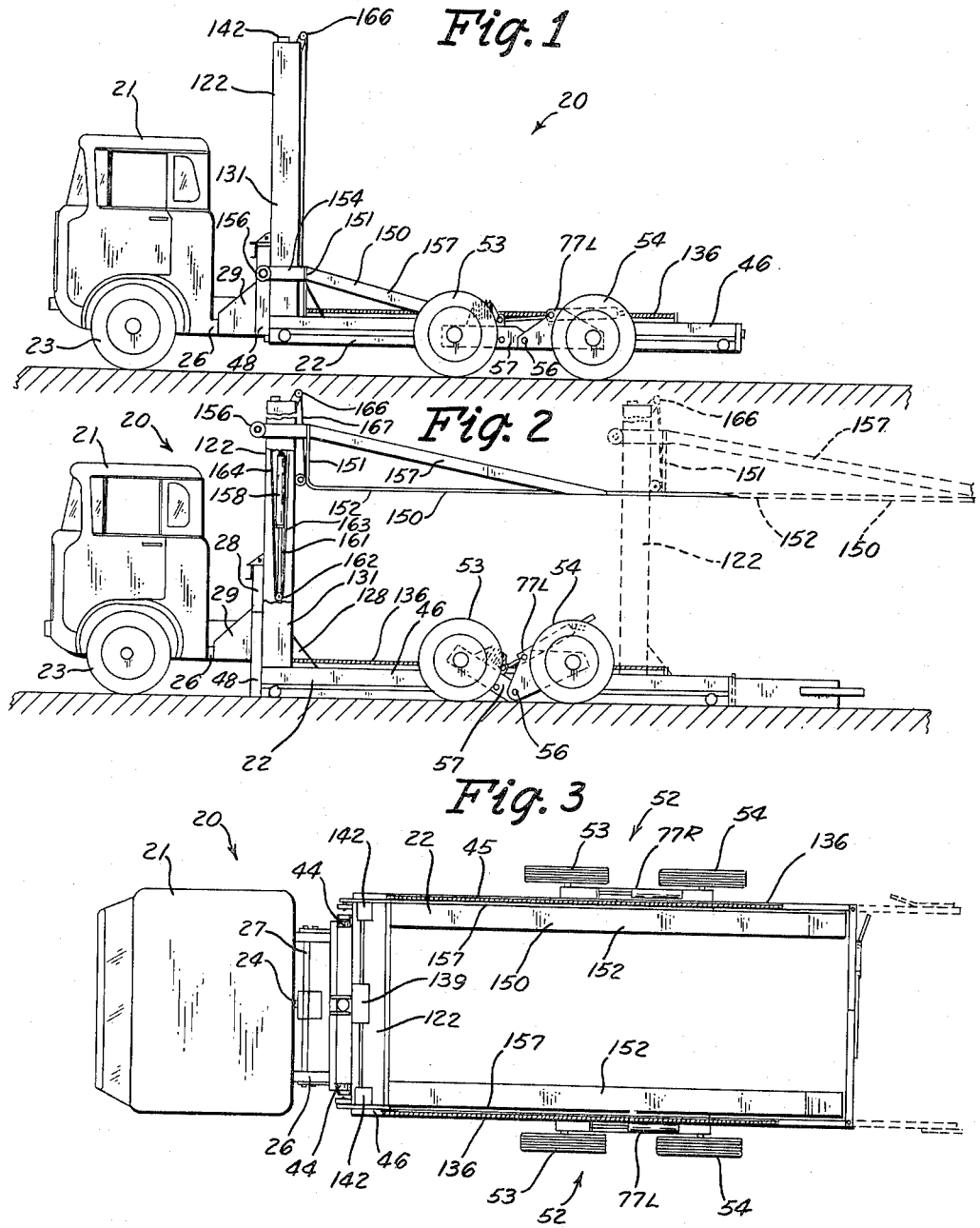

United States Patent Office 3,240,008
Patented Mar. 15, 1966

3,240,008
CONTROL SYSTEM FOR A MATERIAL HANDLING VEHICLE
Wayne W. McMullen, 1002 67th St., Des Moines, Iowa
Filed Apr. 8, 1963, Ser. No. 271,286
2 Claims. (Cl. 60—10.5)

This invention relates generally to trucks for hauling heavy material and specifically to trucks with trailer sections adapted to be lowered to a ground engaging position wherein a fork lift unit is useable.

It is an object of this invention to provide an improved truck.

It is another object of this invention to provide an improved truck having a fork lift unit mounted on the trailer section for vertical movement.

Another object of this invention is to provide an improved truck having a stanchion unit movably mounted on the trailer section for longitudinal movement thereof.

Yet another object of this invention is to provide an improved truck having a stanchion unit longitudinally movable on the trailer section with a vertically movable fork lift unit mounted thereon which is adapted to move from a ground engaging position to a position spaced substantially above the ground and the normal height of the trailer section.

Still another object of this invention is to provide such a truck with a trailer section adapted to be lowered from a normal travel position spaced above the ground to a loading position resting on the ground.

A further object of this invention is to provide a truck having an open trailer section which can back into a loaded pallet or the like until the pallet is disposed between the sides of the trailer section and above a fork lift unit and raise the unit and the loaded pallet to a predetermined height.

Yet another object of this invention is to provide a truck having a trailer section which can back into a loading dock the level of which is higher than the level of the trailer section, which can move a fork lift unit longitudinally of the trailer section and underneath a loaded pallet or the like on the dock, raise the pallet, move it over the trailer section, and lower it to a travel position spaced above the ground, and then lower the pallet completely to the ground at the end of the journey whereby the truck can merely pull away from the ground engaging pallet.

Another object is to provide a wheeled section having a stanchion movable longitudinally thereon and a fork lift movable vertically on the stanchion, wherein the section is ground engageable with all weight off the wheels, and with the fork lift capable of selectively maneuvering a pair of pallets longitudinally aligned within the section from a ground engaging position to a raised position, and vice versa.

Still another object of this invention is to provide a hydraulically powered system for this truck which provides for simultaneous operation of the cylinder units at all times.

Another object of this invention is to provide an improved truck capable of attaining the above designated objectives which is simple but rugged of construction, economical of manufacture, and effective in service.

These objects, and other features and advantages of this invention will become readily apparent upon reference to the following description when taken into consideration with the accompanying drawings, wherein:

FIG. 1 is a side elevational view of the truck, unloaded and in a normal traveling condition;

FIG. 2 is a similar view of the truck, showing the trailer section lowered to the ground, and the fork lift unit raised in full lines, and showing further the stanchion unit, which supports the fork lift unit, moved to rear of the trailer section, by the use of dotted lines;

FIG. 3 is a top plan view of the truck when in the FIG. 1, condtion, and showing the tail pieces swung open for a loading maneuver;

FIG. 4 is an enlarged, fragmentary side elevational view of a tandem wheel unit, parts broken away for clarity of illustration;

FIG. 5 is a view similar to FIG. 4 showing the position of the parts of the wheel unit when the trailer section is lowered to the ground;

FIG. 6 is a fragmentary top plan view of the structure of FIGS. 4 and 5;

FIG. 7 is an enlarged, fragmentary, perspective view of the structure interconnecting the cab section of the truck to the trailer section;

FIG. 8 is an enlarged, fragmentary, detailed perspective view of a fluid actuated locking device for a piston and cylinder unit;

FIG. 9 is an enlarged, fragmentary top plan view of a portion of the structure of FIGS. 3 and 7;

FIG. 10 is an enlarged, fragmentary side elevational view of a detail of the FIG. 9 structure;

FIG. 11 is an enlarged view of the FIG. 10 cylinder unit, shown in longitudinal section;

FIG. 12 is an enlarged view of a valve of FIG. 11;

FIG. 13 is a schematic of the hydraulic system for the truck;

FIG. 14 is an enlarged, fragmentary perspective view of a portion of the trailer section, stanchion frame, and fork lift unit; and FIG. 15 is an enlarged sectional view of a gear box for the stanchion unit.

Referring now to the drawings, the truck of this invention is indicated generally at 20 in FIG. 1 and is comprised of a cab section 21 and a trailer section 22 the latter adapted to move vertically relative to the former.

The cab section is mounted on a pair of wheels 23 and includes a motor, a transmission, a transfer case, and a power take-off shaft 24 (FIG. 9) of which extends rearwardly from the cab section 21. Also at the rear thereof is a pair of frame members 26 (FIG. 9) interconnected by a transverse member 27. At the rear ends of the frame members 26 is a pair of upright channels 28 (FIGS. 7 and 9) supported on the frame members 26 by a pair of gusset plates 29.

At the upper end of the channels 28 is mounted a transverse, horizontally disposed channel 31 (FIG. 7), at the center of which a pair of gusset plates 32 support a vertically disposed first hydraulic cylinder assembly 33 (FIGS. 7, 9 and 10). An elongated shaft 34 (FIG. 9) is rotatably secured by a pair of end plates 35 to the channel 31, and has an L-shaped arm 37 extended downwardly and inwardly from each end, as best illustrated in FIG. 7. The arms 37 are maintained in a normally depending position by a spring 36 interconnected between a plate 38 on the shaft 34, and another stationary plate 30 secured to the lower flange of the channel 31. A fluid actuated locking device 40 (FIG. 7) is adapted to raise the upper plate 38 against the bias of the spring 36, this rotating the shaft 34 and the arms 37 for a purpose hereinafter described.

In their normal positions, each arm 37 extends beneath a lug 39 secured to the forward side of a vertically disposed channel member 41 (FIGS. 7 and 9). The channel members 41 are secured in transversely spaced parallel manner to the front end plate 42 (FIGS. 9 and 14) of the trailer section 22. A plurality of vertically spaced rollers 44 (FIG. 9, only the upper roller 44 showing on each side) are secured in vertically spaced relation to each channel member 41. Each roller 44 is secured by means of a stub shaft 47 inserted through the channel member 41 and secured by a nut to an upright plate 48 mounted within the confines of the respective channel member 41. The front plate 42 (FIG. 10) is connected by a first device 51 to the piston rod 49 of the first cylinder assembly 33.

This structure provides, upon actuation of the assembly 33, whereby the piston rod 49 is extended downwardly therefrom, for a downward movement of the trailer section 22 relative to the cab section 21. Likewise, upon actuation of the cylinder assembly to withdraw the piston rod 49 back into the cylinder thereof, this provides for movement of the trailer section 2 vertically upwardly relative to the cab section 21 to a transport position best illustrated in FIG. 1.

To accommodate the vertical movement of the trailer section 22 relative to the cab section 21 (FIGS. 1 and 2), the trailer section 22 is provided on each side with a pair 52 (FIG. 3) relatively movable ground engaging wheels 53 and 54, interconnected by an axle 56 (FIGS. 4, 5 and 6) which extends transversely into a respective channel member 45 and 46 (FIG. 14) which extends rearwardly in a parallel manner from the outer end of the trailer section front plate 42.

As each pair 52 of wheels is identical to the other, only one will be described. A box-type arm 57 (FIGS. 4 and 6) is connected at one corner 59 thereof to an axle stub shaft 61 for the forward wheel 53. The arm 57 is connected at an opposite corner 62 to the exposed end 63 of the axle 56. Also connected to the axle end 63 at one corner 64 thereof is a pair of transversely aligned, parallel plates 66 and 67, their opposite corners 68 of which are connected to an axle stub shaft 69 for the rear wheel 54.

To provide a shock absorber for each wheel unit 52, a billows 71 is secured at one end to a bracket 72 stationarily mounted on the arm 57, and is secured to another bracket 73 pivotally mounted at 74 to the arm 57. As viewed in FIG. 4, the bracket 73 is pivotal counterclockwise, but due to a stop element 76, clockwise movement is limited to the upright position illustrated.

It may readily be seen, by viewing the structure of the wheel unit 52 in FIGS. 4 and 5, that were the arm 57 and the plates 66 and 67 not further interconnected, these elements would pivot toward each other as best illustrated in FIG. 5, thereby rolling their respective wheels 53 and 54 toward each other due to the weight of the trailer section 22 upon the axle 56. To provide a means for controlling the relative position of the wheels, a second hydraulic cylinder assembly is provided. As designated in FIGS. 3 and 13, the cylinder assembly for the left side of the trailer section 22 is designated 77L, and the right second hydraulic cylinder assembly is designated 77R. Each cylinder assembly 77L and 77R is identical, the only one assembly 77L will be described.

This assembly 77L comprises a cylinder 78 pivotally connected at one end 79 by trunnions 81 mounted at the apex corners 82 of the rear plates 66 and 67. The trunnions 81 are journaled in bearings (not shown) secured at the corners 82. A piston rod 83 is reciprocally movable within the cylinder 78 and is pivotally connected at its outer end by a pivot 84 to the bracket 73. Referring now to FIG. 11, the interior structure of each cylinder 78 is shown. Specifically, the assembly shown in FIG. 11 is that of the first cylinder assembly 33, however, the interior structure of that assembly 33 is identical with both wheel unit assemblies 77L and 77R; except that for the assemblies the valve 99, described hereinafter, is reversed from the position shown in FIG. 11.

Within the cylinder 78 are a pair of circular end members 86 and 87 each of which is provided with an oil seal 88 extended about a bore through which the piston rod, 49 in the assembly 33 and 38 for the assemblies 77L and 77R, extends. The end members 86 and 87 are secured within the cylinder 78 and hold in place a rod bearing and limit member 89 and 90 at each end. Each limit member is provided with an oil ring seal 91 about its outer periphery and a packing ring 92 about a bore formed therein also for the respective piston rod.

Secured to the piston rod 49 (FIG. 11) is a piston 93 secured to the rod 49 by a pair of washers 94 and 95. Annular cavities are provided in both limit members 89 and 90 for receiving the washers. A packing ring 97 extends about the periphery of the piston 93 for engagement with the inner surface 98 of the cylinder 78. A valve 99 (FIGS. 11 and 12) is assembled in the piston 93 for a purpose hereinafter described, and includes an insert 101 threaded into a threaded bore 102, the insert having a base 103 with a port 104.

A spring 106 engages the base 103 and a ball valve 107 adapted to seat in a conical seat 108 formed in the piston 93. Above the seat 108 is a circular bore 109 which flares circularly outwardly and upwardly into another conical surface 111, and which then extends to the top 112 of the piston in a circular cavity 113 of constant diameter. A washer 115 is secured in the cavity 113 flush with the piston top 112. A plurality of parallel canals 114 are formed in the cavity 113.

Reciprocally seated in the cavity 113 is a valve plug 116 integral with an inverted square portion 117 and a square portion 118 inserted through the bore 109. In the position of FIG. 12, the valve 99 is closed to the passage of fluid upwardly through the port 104 and past the ball valve 107, however upon a differential of fluid pressure on the plug 116 side of the valve relative to the bore 109 side, the ball valve 107 would be unseated to where fluid passing downwardly through the cavity 113 and the canals 114 would pass by the portion 117 and flow by the ball 107 and out through the port 104.

Referring particularly to FIG. 11, the full line position of the piston 99 is shown almost engaging the lower surface of the limit member 89 to the extent that the plug 116 is engaged therewith and has forced the ball valve 107 downwardly against the spring 106, thus opening the valve 99 to the passage of fluid from the enlarged chamber 119 into the reduced chamber 121. Further upward movement of the piston 93 would not effect the open position of the valve 99. However, upon an increased fluid pressure in the chamber 121 and a simultaneous decrease in the fluid pressure in the chamber 119, as the piston 93 is going to be forced downwardly as illustrated in FIG. 11 toward the limit member 90, and the spring 106 will force the ball valve 107 against the seat 108, thus closing the valve 99.

It will be noted in FIG. 11 that the upper end of the cylinder 78 has the pair of pivot shafts 81 formed thereon, as viewed in FIG. 7 for the assembly 33, and as viewed in FIGS. 4 and 6 for the assemblies 77L and 77R. It will also be noted that whereas the valve 99 opens for the cylinder 33 (FIG. 11) when the lift member 51 (FIG. 10) is raised to its uppermost position, the second cylinder assemblies 77L and 77R are opposite (FIG. 13) as indicated by the dotted line positions of the valves 99. Thus, when the piston rods 83 of the assemblies 77L and 77R are extended their limit in raising the trailer section 22 (FIG. 4), the valves 99 (FIG. 13) open. This will be described more in detail hereinafter.

Movably mounted in the trailer section 22, which includes the front plate 42 (FIG. 14), and the two side channel members 45 and 46 extended rearwardly therefrom to provide a U-shaped trailer section 22 (see FIG. 3), is a stanchion frame unit 122, hereinafter referred to as the stanchion. The stanchion unit 12 comprises basically a pair of upstanding, parallel leg units having a box member 123 extended across their tops. Each leg unit includes an inner post 124 which has a roller 126 rotatably attached to the lower end thereof for movement within the respective channel shaped members 45 and 46, the roller 126 actually rolling on the lower flange 127 thereof. A large gusset plate 128 is secured to the inner post 124 and extends rearwardly therefrom for supporting another roller 129.

An outer post 131 (FIG. 14) is secured between the box member 123 and each channel member 45 and 46, parallel to and transversely spaced from said inner post 124, and has connected thereto adjacent the base a gear box unit 132 (FIGS. 14 and 15). The unit 132, also connected to the respective inner post 124 spaced inwardly from each outer post 131, comprises a housing 133 having a worm gear 134 rotatably mounted therein and threadably engaged with a worm shaft 136 mounted on top of and which extends the entire length of each channel 45 and 46. Each worm shaft 136 is spaced above the upper flange of each channel by a pair of brackets 137 and 138 sufficiently that each gear box unit 132 is movable on each worm shaft 136.

Power is supplied to rotate each worm gear 134 from a motor unit 139 (FIG. 14) mounted on top of the box member 123, with drive shafts 141 extended outwardly therefrom to a pair of differential units 142. Driven shafts 143 depend from the units 142 between the inner and outer posts 124 and 131, respectively, and each is journaled in a bearing 144 (FIG. 15) within the housing 133. A bevel gear 146 at the lower end of each shaft 143 transmits the drive to a bevel gear 147 integral with the worm gear 134.

Thus, upon operation of the motor unit 139, resulting in rotation of the worm gears in a predetermined direction, the motor unit being reversible, a jack screw effect results in the stanchion 12 "walking" backwards or frontwards on the trailer section 22, the rollers 126 and 129 effecting a smooth friction-free type movement to the stanchion 122. Referring to FIG. 2, the full line position of the stanchion shows it in its forwardmost position, and the dotted line position shows it at its most rearward position.

FIG. 2 also shows by the use of full and dotted lines the raised forward and rear position of a fork lift unit 150, adapted to move from a ground engaging position intermediate the trailer section channels 45 and 46 (FIG. 3), and extended into the open area therebetween, to a raised position as shown in FIG. 2. And as the fork lift unit 150 is movably carried on the stanchion 122, it is movable forwardly and rearwardly with the stanchion.

The fork lift unit 150 (FIG. 14) comprises a pair of parallel, transversely spaced L-shaped lift members the vertical portions 151 of which are secured to a transverse brace 155 and the longitudinally extended horizontal portions 152 of which extend parallel to and just inside, from a plan viewpoint as seen in FIG. 3, the channel members 45 and 46. Each vertical portion 151 has a roller 153 rotatably secured thereto which is engaged with the rear face or edge of the inner post 124.

The brace 152 has extended forwardly from each end a strut 154 which is disposed adjacent an outer post 131 and which also has a roller 156 secured thereto and engaged with the forward face or edge of each outer post 131. Extended rearwardly from each brace end is a support arm 157 the outer end of which is secured to a respective lift member horizontal portion 152. By this arrangement, the fork lift unit 150 is capable of supporting heavy loads or the portions 152 and of rolling up and down on the stanchion 122.

To provide for controlling the up and down movement of the fork lift unit 150, a pair of fluid operated third cylinder assemblies 158 and 159 (FIGS. 2, 13 and 14) are vertically mounted, each assembly between a respective pair of inner and outer posts 124 and 131, and with the piston rod 161 thereof extended downwardly. Each assembly 158 and 159 is a single acting type cylinder operable to force the rod 161 outwardly and downwardly. The outer end of each rod 161 has a pulley 162 (FIG. 2) rotatably secured thereto, which engages a cable 163. One end 164 of the cable 163 is secured to the underside of the box member 123, the cable is then trained beneath the pulley 162 and upwardly to another pulley 166 (FIGS. 2 and 14) secured to the upper rear side of the box member, and the cable end 167 being secured to the lower rearside of a vertical portion 151.

Thus, by controlling the flow of fluid under pressure to the assemblies 158 and 159, the fork lift unit 150 can be lifted from the ground to a raised position, and lowered again; or it can be held in any pretetermined position due to the position of the piston rods 161 and their cables 163.

Referring now to FIG. 13, a schematic of the hydraulic system for operating the vehicle is illustrated. The PTO shaft 24 is connected to operate a hydraulic pump 170 which forces fluid through one conduit 171 to a control valve 172 for the trailer section 22, withdraws fluid through another conduit 173 from a fluid reservoir 174, and forces the fluid through a third conduit 176 to a control valve 177 for the cylinder assemblies 158 and 159 for raising and lowering the fork lift unit 150. It will be remembered that a separate motor 139, not depicted in FIG. 13, and having an independent control, was provided for moving the stanchion 122 (FIG. 14) back and forth.

From the control valve 172 a bypass line 175 (FIG. 13) leads to the reservoir 174, and a pair of conduits are adapted to transmit fluid to a pair of restrictor valves 178 and 179, both valves operable to restrict the flow of fluid from right to left therethrough, as one views the valves in FIG. 13. To effect a lifting or raising of the trailer section from the ground engaging position of FIG. 2, fluid is transmitted through the valve 179 and a conduit 181 to the rear end of the assembly 77L, effecting an extension of the piston rod 83 and thus forcing apart the plates 66 and 67 from the arm 57 of the left wheel unit 52 (FIGS. 4 and 5). A raising of the axle 56 and thus a lifting of the trailer section 22 results.

In response to extended movement of the piston rod 83 of assembly 77L, fluid is transmitted through conduit 182 to the rear end of assembly 77R, effecting a separation of the plates 66 and 67 from the arm 57 of the right wheel unit 52 (FIG. 6), thus lifting the right side of the trailer section 22. Simultaneously, fluid forced from the front end of the assembly 77R is transmitted through conduit 183 to the lower end of the assembly 33 to effect a lifting of the front end of the trailer section 22 concurrently with the lifting of the sides.

A conduit 184 leads from the upper end of the assembly 33 through the restrictor valve 178 to the control valve 172, another conduit 185 connected between the valve 172 and the reservoir 174 serving as a return line. It will readily be observed that upon positioning of the control valve 172 to transmit fluid outwardly through the conduit 184 as opposed to the conduit 181, the cylinder assemblies 33, 77R, and 77L are actuated to effect a lowering of the trailer section 22 from the FIG. 1 position to the FIG. 2 position. The restrictor valves 178 and 179 operate to keep the trailer section 22 level or horizontal during the raising and lowering operation. The valves 99 permit a continued flow through each cylinder assembly even though the respective piston 93 thereof has bottomed, i.e., engaged the upper limit member (see the valve 99 shown in dotted line in FIG. 13 indicating all pistons bottomed). Thus, in case one cylinder assembly has not bottomed whereas the other two assemblies have, the hydraulic system will continue to function properly until the former assembly completes its stroke.

When the hydraulic assemblies 33, 77R, and 77L are in the condition illustrated in FIG. 13, with the trailer section raised as indicated in FIGS. 1, 4, 7 and 8, a lift lock is provided for each cylinder assembly automatically to lock each assembly in the travel position thereof, acting thereby as a safety means for preventing accidental lowering of the trailer section 22 in case of hydraulic failure.

Referring to FIG. 7, the device 40 includes a hydraulic cylinder 186 mounted on the plate 30 and having a piston rod 187 extended upwardly. A conduit 188 is connected by a T-valve 189 to a supply conduit 191 also connected by a T-valve 192 to the conduit 184. It will be noted that the spring 36 (FIG. 7) biases the plate 38 downwardly thus holding the arms 37 beneath the lugs 39. The channel 48 for the trailer section 22 is thus prevented from lowering unless the cylinder 186 is actuated to raise the rod 187 which has a member 193 adapted to engage and lift the plate 38. Thus, the arms 37 will be rotated outwardly from under the lugs 39.

A U-shaped bracket 194 (FIG. 8) is pivotally mounted on each trunnion 195 (FIG. 4) mounted on the rear end of each second cylinder 78, and is held directly behind the rod 83 when it is in the extended, trailer section raising position. Raising the bracket 194 upwardly to the limited position of FIG. 8 against a flange 196 of a plate 197 secured to the cylinder 78, is a spring 198 connected between the flange 196 and the bracket 194. Attached to the plate 197 is a cylinder 199 with a piston rod 200 secured to the bracket 194. A conduit 201 (FIG. 13) is connected to the T-valve 189 and leads to the cylinder 199 for the assembly 77R and also to the cylinder 199 for the assembly 77L. When the hydraulic system is being operated to raise or lower the trailer section 22, the cylinders 199 are actuated to extend their rods 200 to pivot the brackets 194 downwardly, thereby permitting unimpeded movement of the cylinder assemblies' piston rods 83.

To effect a release of pressure within the cylinders 199 after the trailer section 22 has been raised, rotation of the PTO shaft 24 is stopped, with the control valve 172 remaining in the raised position. The restrictor valves 178 and 179 permit the restricted pressure in conduit 184 to drop to zero with the elements retaining their positions. When the piston-type pump 170 stops operation, it holds the high pressure in conduit 181 to support thereby the load on all three cylinders 33, 77L, and 77R. The respective springs 36 and 198 thereby bias the plate 30 and the brackets 194, respectively, to the positions illustrated in FIGS. 7 and 8.

It should be stated here that the restrictor valves 178 and 179 build up pressure in either conduit 181 and 184, whichever one is returning fluid to the reservoir 174 for several reasons. One reason is to support the rear end of the trailer section 22 in a level position regardless of uneven load distribution. Another reason is to keep the section 22 from dropping fast and forming a vacuum in the cylinders. The loaded trailer section 22 is lowered under pressure supplied by the pump 170, as well as it is raised under pressure. And, as mentioned hereinbefore, the restricted pressure in conduit 184 is used to move the locking devices to their lock releasing positions prior to lowering the trailer section 22 to the ground.

Referring to FIG. 13, again the hydraulic arrangement for raising and lowering the fork lift unit 150 is seen to be substantially identical to that for the side cylinders 77L and 77R. A conduit 205 leads from the control valve 177 to a restrictor valve 211, and another conduit 202 leads to the upper end of the cylinder 159. A conduit 203 connects the lower end of the cylinder 159 to the upper end of the cylinder 158, and another conduit 204 communicates the lower end of the cylinder 158 to a restrictor valve 206, from whence a conduit 207 leads back to the control valve 177. A by-pass line 208 is connected between the control valve 177 and the reservoir 174. All of the advantages of the trailer section hydraulic arrangement are thus applicable to the fork lift unit hydraulic arrangement.

Although the trailer section 22 is depicted as having non-driving tandem wheels, it is to be remembered that they could be driven; furthermore, the trailer section could be connected by a tongue or fifth wheel plate instead of the illustrated arrangement.

In summation, a vehicle has been described herein which includes a trailer section vertically movable relative to the cab section, a stanchion frame longitudinally movable on the trailer section, and a fork lift unit vertically movable on the stanchion frame from a ground engaged position.

Some changes may be made in the construction and arrangement of my load carrying vehicle without departing from the real spirit and purpose of my invention, and it is my intention to cover by my claims, any modified forms of structure or use of mechanical equivalents which may be reasonably included within their scope.

I claim:

1. A hydraulically powered system, comprising, a fluid pump, a first power cylinder, a conduit connecting said cylinder at one end to said pump, said cylinder having a piston rod and a piston secured thereto movable within said power cylinder, said piston cooperating with said cylinder to form chambers on either side of said piston, said conduit being in communication with one of said chambers adjacent said one end of said cylinder, said piston having a port extending therethrough and adapted to be in communication with each of said chambers, a normally closed valve means in said port, actuating means for yieldingly opening said valve upon said piston moving a predetermined distance in said cylinder thereby allowing fluid to pass from said one chamber to the other chamber, a connecting condiut in communication with said other chamber; a second power cylinder being connected at one end to said connecting conduit, a piston in said second cylinder and mounted on a movable piston rod, said piston in said second cylinder cooperating with said second cylinder to form a chamber on either side of said piston, said connecting conduit being in communication with one of said chambers adjacent said one end of said second cylinder, whereby as said fluid moves from said first cylinder to said second cylinder said piston in said second cylinder is moved to the other end thereof, a conduit connecting said other chamber of said second cylinder to a reservoir, said reservoir being in communication with said pump, and said piston in said second cylinder has a port formed therethrough adapted to communicate with each of said chambers in said second cylinder, a normally closed valve means in said port and an actuating means for yieldingly opening said valve means in said second cylinder upon said piston rod therein moving a predetermined distance and thereby permitting return of said fluid to said reservoir, a closable valve in said conduit connecting said other chamber to said reservoir, said pump is adapted to pump fluid into said other chamber of said second cylinder to move said piston therein a predetermined distance towards said one end thereof, and said valve in said second cylinder adapted to open under a predetermined pressure to place said one chamber of said second cylinder in communication with said other chamber of said first cylinder and thereby return said piston therein to adjacent said one end of said first cylinder, and a bypass line being connected to said conduit connected to said other chamber of said second cylinder, a locking means associated with each of said cylinders and adapted to lockingly engage said piston rods, a cylinder for operating each of said locking means and being connected to said bypass line, spring means for normally holding said locking means in engagement with said piston rods, said cylinders for operating said locking means being actuated to disengage said locking means from said piston rods upon a fluid pressure being created in said bypass line for operating said cylinders connected to said locking means.

2. The structure of claim 1 wherein said piston rods in said first and second cylinders extend therethrough and said locking means is further defined as being a U- shaped bracket pivotally connected to each of said cylinders and adapted to pivot in the path of movement of said piston rods, said spring means tending to pivot said brackets to a position in the path of said piston rods and said cylinders connected to said bypass line adapted to pivot said brackets out of said path of movement of said piston rods.

References Cited by the Examiner

UNITED STATES PATENTS

| | | | |
|---|---|---|---|
| 2,130,618 | 9/1938 | Gnavi | 91—45 |
| 2,368,659 | 2/1945 | Heineck et al. | 91—45 |
| 2,437,806 | 3/1948 | Dempster | 214—670 |
| 2,442,577 | 6/1948 | Ashton | 91—45 |
| 2,709,420 | 5/1955 | Fullwood et al. | 91—401 |
| 2,721,447 | 10/1955 | Hancock | 91—45 |
| 2,733,825 | 2/1956 | Evans | 214—672 |
| 2,773,614 | 12/1956 | Edward et al. | 214—73 |
| 2,774,604 | 12/1956 | Rendel et al. | 280—43.23 X |
| 2,996,206 | 8/1961 | McKee | 214—670 |
| 3,051,340 | 8/1962 | Ely | 214—512 |
| 3,064,834 | 11/1962 | Dempster | 214—75 |
| 3,119,506 | 1/1964 | Bridge et al. | 214—670 |

FOREIGN PATENTS

| | | |
|---|---|---|
| 637,840 | 3/1962 | Canada. |
| 964,400 | 5/1957 | Germany. |
| 1,039,935 | 9/1958 | Germany. |
| 886,226 | 1/1962 | Great Britain. |

GERALD M. FORLENZA, *Primary Examiner.*

MORRIS TEMIN, HUGO O. SCHULZ, *Examiners.*